United States Patent Office 3,545,954
Patented Dec. 8, 1970

3,545,954
PRODUCTION OF AMMONIUM NITRATE-PHOSPHATE FERTILIZER
Robert E. Alston, Medicine Hat, Alberta, Canada, assignor to Northwest Nitro Chemicals, Ltd., Medicine Hat, Alberta, Canada, a corporation
No Drawing. Filed Aug. 29, 1967, Ser. No. 663,940
Int. Cl. C05b 7/00
U.S. Cl. 71—35      4 Claims

ABSTRACT OF THE DISCLOSURE

A process for the production of ammonium nitrate-phosphate by compacting finely ground ammonium nitrate and finely ground ammonium phosphate to form a compacted sheet and grinding in a granulating mill to produce a nonsegregating ammonium nitrate-phosphate fertilizer.

SUMMARY OF THE INVENTION

This invention relates to the production of an ammonium nitrate-phosphate fertilizer composition. In a particular aspect, it relates to a process for the production of a nonsegregating fertilizer composition from finely ground ammonium nitrate and ammonium phosphate.

Ammonium nitrate-phosphate mixtures are well known in the fertilizer industry. Such high analysis mixtures i.e., rich in nitrogen and phosphorus, can be applied directly to the soil or can be mixed with other fertilizer ingredients, such as potash and the like, to provide a complete fertilizer. Previously such mixtures have usually been provided by mixtures of crystalline, prilled, or granulated ammonium nitrate, ammonium sulfate or urea along with ammonium phosphate. Such mixtures, however, are troublesome due to segregation during shipping and handling operations and poor spreading qualities during application. Segregation occurs due to a difference in bulk density and particle size of the ingredients.

The use of a compacting mill to press together fine particles of a substance to produce larger granules is a well-known process. F. W. Cox, Jr. and John J. Roemer in U.S. Pat. 2,997,378 described such a process for producing porous ammonium nitrate from high density ammonium nitrate. According to their process, the high density ammonium nitrate was compacted at from ambient temperature to 200° F., preferably 140–190° F., and the compacted sheet or pellet was then broken into particles of the desired size. I. B. Phillips, U.S. Pat. 2,935,387 also described a process for compacting fine particles of muriate of potash in the presence of a muriate of potash brine at a temperature of at least 200° F., followed by flaking and crushing to the desired granular size.

It is an object of this invention to provide a method for the production of ammonium nitrate-phosphate compositions.

It is another object of this invention to provide a nonsegregating mixture of ammonium nitrate and ammonium phosphate.

A process has been discovered for the production of a granular composition of ammonium nitrate and ammonium phosphate which is nonsegregating during shipping, handling, and spreading operations. According to the process of this invention, the composition is provided by delivering a ground, mixed blend of ammonium nitrate and ammonium phosphate to a suitable compacting means, compressing the mixture under pressure to form a compacted mass, breaking the compacted mass to form coarse flakes or chips, and grinding the flakes or chips to the desired granular size.

DETAILED DESCRIPTION

The ammonium nitrate used in the process of this invention can be provided by any commercially available process, i.e., it can be granulated ammonium nitrate from the so-called Stengel process, prilled, or crystalline and can be coated or uncoated. Preferably the ammonium nitrate is uncoated and of varying mesh size particles.

The term ammonium phosphate as used herein encompasses monoammonium phosphate and diammonium phosphate or mixtures thereof. These products are common articles of commerce and the usual commercial grades are suitable for the practice of this invention.

The process is suitable for the production of any mixture of ammonium nitrate and ammonium phosphate in accordance with consumer requirements. Generally, the process is used for the production of mixtures of from between about 80% ammonium phosphate to 20% ammonium nitrate to about 80% ammonium nitrate to 20% ammonium phosphate. One preferred mixture is 1:1 which gives a product having an analysis of 23–23–0 when the ammonium phosphate is monoammonium phosphate having an analysis of 11–48–0.

In accordance with the process of this invention, the ammonium nitrate and ammonium phosphate are delivered to the compacting step in a finely ground and well mixed condition. The materials can be either ground separately and then mixed or they can be mixed before grinding. Any suitable grinding and mixing means, many of which are known can be used in the practice of this invention. For example, a cement mixer is a suitable mixing means and a vibratory ball mill is a suitable grinding means. Preferably, but not necessarily, the components are ground sufficiently fine that most of the particles will pass a 20 mesh screen (U.S. Standard sieve), some fines in the −20+40 range, with the majority in the −40+200 range, and also preferably but not necessarily, a substantial proportion, e.g., from 10–30%, passes a 200 mesh screen.

The compacted material is an aggregation of individual particles of ammonium nitrate and ammonium phosphate held together to form a sheet, block or briquet. The aggregated granules are virtually homogeneous, at least on a macro scale.

Any suitable compacting means and granulating means can be used in the process of this invention and it is not intended that this process be limited to any particular type.

In a preferred process the compacting is effected by means of compacting rolls, but a pelleting or a briqueting press is also a suitable compacting means. The preferred compacting rolls provide several advantages of which an important one is that the compacted material is obtained in the form of a sheet which is easily broken to coarse flakes and which in turn are easily ground to the desired granular size.

In the compacting roll process the mixed and ground ammonium nitrate-ammonium phosphate starting material is passed, usually, but not necessarily, by gravity feed, between rotary rollers having slightly roughened surfaces to enable the rollers to perform a gripping action on the feed material. The rolls can be operated at ambient or elevated temperatures, but ambient temperatures are preferred. A description of such compacting rolls is given in U.S. Pat. 2,997,378, which description is incorporated herein by reference thereto.

The compacted material emerges from the compacting rolls as a hard, brittle, thin sheet which is fed to a breaker which may be of any desired construction and which breaks the sheet into the desired coarse flakes or chips. One suitable breaker consists of a flaking roller operating in relation to an inclined trough or plane.

The coarse flakes or chips are delivered to a suitable crusher or granulating mill for grinding to the desired granular size range. Preferably the coarse flakes are passed over a screen prior to grinding to separate particles which are already in the desired granular size range. A suitable granulating mill is described in U.S. Pat. 2,935,387. Other suitable mills known to those skilled in the art include the Le Page mill manufactured by Allis Chalmers Corporation and the Fitzpatrick mill manufactured by the Fitzpatrick Company.

The product from the granulating mill is usually, but not necessarily, screened to eliminate fines or oversize, or both, and the granulated product is then suitable for bagging or further blending with other fertilizer materials. If desired, the separated fines, if any, are recycled to the compacting mill and the separated oversize particles, if any, are recycled to the granulating mill.

The following examples further illustrate the invention.

EXAMPLE 1

Uncoated ammonium nitrate, 25 lb., and monoammonium phosphate analyzing 11–48–0, 25 lb., were separately ground in a vibratory ball mill. The particle size distribution was as follows:

PARTICLE SIZE DISTRIBUTION

| Mesh size (U.S.): | Ammonium phosphate, percent | Ammonium nitrate, percent |
|---|---|---|
| +8 | 3.7 | 0.2 |
| −8+10 | 11.6 | 2.4 |
| −10+14 | 7.5 | 4.0 |
| −14+20 | 7.4 | 7.0 |
| −20+28 | 6.6 | 9.8 |
| −28+35 | 6.0 | 10.7 |
| −35+48 | 6.2 | 11.2 |
| −48+65 | 8.3 | 12.4 |
| −65+100 | 8.2 | 9.3 |
| −100+150 | 6.4 | 6.3 |
| −150+200 | 9.0 | 6.7 |
| −200 | 19.1 | 20.0 |

The ground material was then blended in a small motorized cement mixer and the blended material was then fed by gravity feed to a Compactor compaction mill manufactured by Allis Chalmers Corp. having rolls 24 inches in diameter with 8-inch faces.

The temperature of the Compactor rolls was ambient temperature—about 70° F. The rolls were spaced 0.039 inch apart and were operated at 2 r.p.m. The initial bearing pressure on the rolls was 500 lbs. and when open the pressure was 1400 lbs.

After compaction, the mixture emerged from the mill in the form of an 8" wide ribbon sheet, 0.315 inch thick. It was passed through a breaker which broke it into coarse, very hard flakes, 81% of which were retained on a 16 mesh screen. The material retained on the screen was ground to product size, i.e., about −7+20 in a granulating mill of the type described in U.S. Pat. 2,935,387, which is incorporated herein by reference thereto, to give a nonsegregating, nearly homogeneous, granulated 23–23–0 fertilizer.

EXAMPLE 2

The experiment of Example 1 was repeated except that 35 lbs. of ammonium nitrate and 15 lbs. of monoammonium phosphate (11–48–0) were employed. The materials were ground separately, then thoroughly mixed together before compacting. The Compactor mill was operated as before and the open bearing pressure was 1500 lb. and the flake thickness obtained was 0.304 inch. A yield of 81% retention on a 16 mesh screen was again obtained. The screened material was ground to product size in a granulating mill to yield a 27–14–0 fertilizer.

EXAMPLE 3

The experiment of Example 1 was repeated except that the space between the Compactor mill rolls was increased to 0.055 inch and open bearing pressure was 1000 lbs. Throughput of the material was 20.2 lb./min., flake thickness 0.220 inch. A yield of 74% was obtained on a 16 mesh screen after breaking. The screened material was then ground to yield a 23–23–0 fertilizer.

EXAMPLE 4

The experiment of Example 1 was repeated except that 20% of the feed to the Compactor mill consisted of fines from the experiment of Example 1. The fines were passed through a fine screen prior to blending to break agglomerates which had formed during storage under humid conditions. The Compactor mill was operated as before and open bearing pressure was 1500 lbs. The throughput rate was 32 lb./min. to produce a ribbon of 0.317 inch thickness. After breaking, a yield of 75% of very hard flake was obtained on a 16 mesh screen. The screened material was ground to product size to yield a 23–23–0 fertilizer.

EXAMPLE 5

The experiment of Example 2 was repeated except that 20% of the feed consisted of the fines from Example 2. The Compactor mill was operated as before and the open bearing pressure was 1400 lbs. Throughput was 25.2 lb./min. of 0.318 inch thick ribbon which on breakage yielded 76% of very hard flake retained on a 16 mesh screen. The flaked material was ground to product size to yield a 27–14–0 fertilizer.

EXAMPLE 6

The experiment of Example 1 was repeated except that the ammonium nitrate and ammonium phosphate were first mixed and blended and then ground in the vibratory ball mill. The Compactor mill was operated in the same manner as in Example 1. The throughput was 27.3 lb./min. of 0.302 inch thick ribbon which on breakage yielded 87% of very hard flakes retained on a 16 mesh screen. The screened material was ground to product size to yield a 23–23–0 fertilizer.

EXAMPLE 7

The experiment of Example 1 is repeated except that diammonium phosphate is substituted for monoammonium phosphate. A nonsegregating, nearly-homogeneous, granular fertilizer is obtained.

EXAMPLE 8

The experiment of Example 1 is repeated except that ammonium nitrate 10 lb. and monoammonium phosphate, 40 lb. are used. A nonsegregating, nearly homogeneous, granular fertilizer is obtained.

EXAMPLE 9

The experiment of Example 1 is repeated except that ammonium nitrate 10 lb. and diammonium phosphate 40 lb. are used. A nonsegregating, nearly homogeneous, granular fertilizer is obtained.

EXAMPLE 10

The experiment of Example 1 is repeated except that ammonium nitrate 40 lb. and diammonium phosphate 10 lb. are used. A nonsegregating, nearly homogeneous, granular fertilizer is obtained.

EXAMPLE 11

The experiment of Example 1 is repeated except that ammonium nitrate 25 lb., monoammonium phosphate 12.5 lb. and diammonium phosphate 25 lb. are used. A nonsegregating, nearly homogeneous, granular fertilizer is obtained.

I claim:
1. A process for the production of a granular ammonium nitrate-ammonium phosphate fertilizer composition comprising the steps of compacting a ground, mixed blend of ammonium nitrate and monoammonium phosphate or diammonium phosphate or a mixture thereof to produce a compacted material, breaking said compacted material produced thereby, and grinding said broken compacted material to produce said granular ammonium nitrate-ammonium phosphate composition.

2. The process of claim 1 wherein the ratio by weight of ammonium nitrate to ammonium phosphate is from about 4:1 to 1:4 and the ammonium phosphate is monoammonium phosphate.

3. The process of claim 1 wherein the ratio by weight of ammonium nitrate to ammonium phosphate is from about 4:1 to 1:4 and the ammonium phosphate is diammonium phosphate.

4. the process of claim 1 wherein the ammonium phosphate is a mixture of monoammonium phosphate and diammonium phosphate in a ratio of about 1 part to 4 parts by weight of ammonium nitrate to about 4 parts to 1 part of ammonium phosphate.

References Cited

UNITED STATES PATENTS

| | | | |
|---|---|---|---|
| 1,567,408 | 12/1925 | Axelsen | 71—64D |
| 1,989,756 | 2/1935 | Klugh | 71—64D |
| 3,135,473 | 6/1964 | Schrader et al. | 71—64D |

FOREIGN PATENTS

| | | | |
|---|---|---|---|
| 700,350 | 12/1953 | Great Britain | 71—36 |

REUBEN FRIEDMAN, Primary Examiner

R. BARNES, Assistant Examiner

U.S. Cl. X.R.

71—36, 64